United States Patent
Koga et al.

(10) Patent No.: US 9,898,079 B2
(45) Date of Patent: Feb. 20, 2018

(54) GRAPHICAL USER INTERFACE FOR NON-FOVEAL VISION

(71) Applicant: Drivemode, Inc., San Jose, CA (US)

(72) Inventors: Yokichi Koga, Los Altos, CA (US); Jeffrey Allen Standard, San Bruno, CA (US); Masato Miura, Oakland, CA (US)

(73) Assignee: Drivemode, Inc., Redwood City, CA (US)

( * ) Notice: Subject to any disclaimer, the term of this patent is extended or adjusted under 35 U.S.C. 154(b) by 357 days.

(21) Appl. No.: 14/730,715

(22) Filed: Jun. 4, 2015

(65) Prior Publication Data

US 2015/0362991 A1    Dec. 17, 2015

Related U.S. Application Data

(60) Provisional application No. 62/010,693, filed on Jun. 11, 2014.

(51) Int. Cl.
| | |
|---|---|
| *G06F 3/00* | (2006.01) |
| *G06F 3/01* | (2006.01) |
| *G06F 3/0482* | (2013.01) |
| *G06F 3/0338* | (2013.01) |

(52) U.S. Cl.
CPC ............ *G06F 3/013* (2013.01); *G06F 3/0338* (2013.01); *G06F 3/0482* (2013.01)

(58) Field of Classification Search
CPC .. G06F 17/30011; G06F 3/0482; G06F 3/013; G06F 3/017; G06F 17/30867; G06F 13/4027; G06F 17/30017; G06F 19/321; G06F 1/1613; G06F 1/1616
See application file for complete search history.

(56) References Cited

U.S. PATENT DOCUMENTS

| | | |
|---|---|---|
| 8,769,551 B2 | 7/2014 | Lapuyade |
| 9,350,761 B1 | 5/2016 | Enderwick et al. |
| 9,591,117 B1 | 3/2017 | Toren |
| 9,699,301 B1 | 7/2017 | Siritzky |
| 2004/0122572 A1 | 6/2004 | Ichinose |

(Continued)

FOREIGN PATENT DOCUMENTS

| | | |
|---|---|---|
| EP | 2305506 B1 | 6/2013 |
| FR | 2988348 A1 | 9/2013 |

OTHER PUBLICATIONS

"International Application Serial No. PCT/US2015/034501, Written Opinion dated Jun. 15, 2016", 7 pgs.

(Continued)

*Primary Examiner* — Di Xiao
(74) *Attorney, Agent, or Firm* — Schwegman Lundberg & Woessner, P.A.

(57) ABSTRACT

A device may be configured to provide a graphical user interface that is specifically designed for use in a person's non-foveal vision. Via a graphical user interface for non-foveal vision, a user may interact with the device without focusing his or her foveal vision on a touchscreen of the device. Thus, the user may operate the device and its applications entirely and exclusively without using his or her foveal vision. For example, the user may operate the device exclusively using his or her peripheral vision or using no vision whatsoever.

27 Claims, 12 Drawing Sheets

(56) References Cited

U.S. PATENT DOCUMENTS

| | | | |
|---|---|---|---|
| 2005/0162402 A1* | 7/2005 | Watanachote | G06F 3/03547 345/173 |
| 2008/0024451 A1 | 1/2008 | Aimi et al. | |
| 2009/0172598 A1* | 7/2009 | Yamanaka | G06F 3/0482 715/841 |
| 2010/0268426 A1 | 10/2010 | Pathak et al. | |
| 2010/0333045 A1* | 12/2010 | Gueziec | G06F 3/016 715/863 |
| 2011/0184738 A1* | 7/2011 | Kalisky | G06F 3/167 704/260 |
| 2011/0193857 A1* | 8/2011 | Filippov | G06F 9/4443 345/419 |
| 2013/0104040 A1 | 4/2013 | Birnbaum et al. | |
| 2013/0275924 A1* | 10/2013 | Weinberg | G06F 3/017 715/863 |
| 2014/0152600 A1 | 6/2014 | Lee et al. | |
| 2014/0278033 A1* | 9/2014 | Scofield | G02B 27/01 701/118 |
| 2015/0160807 A1* | 6/2015 | Vakharia | G06Q 30/0627 705/26.63 |
| 2015/0213778 A1* | 7/2015 | Moravetz | G09G 5/006 345/520 |

OTHER PUBLICATIONS

"International Application Serial No. PCT/US2015/034501, International Preliminary Report on Patentability dated Sep. 19, 2016", 8 pgs.

"International Application Serial No. PCT/US2015/034501, International Search Report dated Aug. 26, 2015", 3 pgs.

"International Application Serial No. PCT/US2015/034501, Written Opinion dated Aug. 26, 2015", 7 pgs.

Eisele, Kai, "Controls at your fingertips", Daimler Technicity, (Apr. 16, 2014), 4 pgs.

* cited by examiner

GRAPHICAL USER INTERFACE FOR NON-FOVEAL VISION

RELATED APPLICATION

This application claims the priority benefit of U.S. Provisional Patent Application No. 62/010,693, filed Jun. 11, 2014, which is incorporated herein by reference in its entirety.

TECHNICAL FIELD

The subject matter disclosed herein generally relates to electronic devices and the processing of data thereon. Specifically, the present disclosure addresses systems and methods involving a user interface for non-foveal vision.

BACKGROUND

Human vision is describable in terms of foveal vision and peripheral vision. Foveal vision (e.g., central vision) is that portion of human vision that occurs within a central region of the field of view (e.g., visual field) and provides sharp visual focus. This central region may also be called the center of gaze. Peripheral vision is that portion of human vision that occurs outside of foveal vision but still within the field of view (e.g., outside the central region, from the edges of the central region to the edges of the field of view). Peripheral vision may also be called extrafoveal vision.

BRIEF DESCRIPTION OF THE DRAWINGS

Some embodiments are illustrated by way of example and not limitation in the figures of the accompanying drawings.

DETAILED DESCRIPTION

Figure 1:
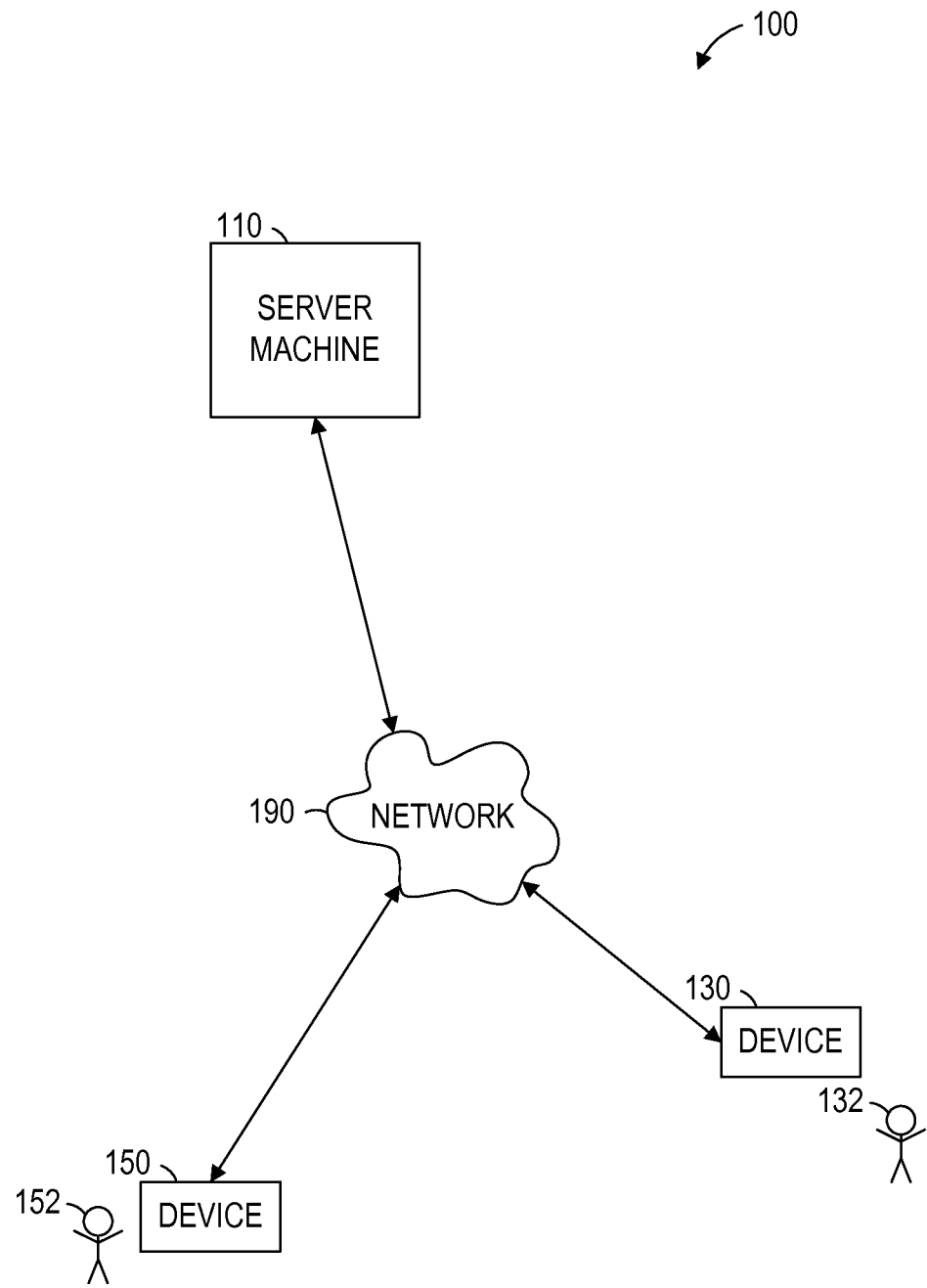
FIG. 1 is a network diagram illustrating a network environment in which a server may provide a device with software for displaying and utilizing a graphical user interface for non-foveal vision, according to some example embodiments.

Example methods and systems are directed to a graphical user interface for non-foveal vision (e.g., peripheral vision). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In today's technological environment, it is common for people to interact with devices (e.g., electronic devices, such as smart phones, tablet computers, or other touchscreen devices) in environments in which their eyes, hands, or both, are generally occupied with a primary task that is being performed (e.g., driving a car). However, user input to such devices typically involves touching one or more buttons, icons, keyboards, and other manipulable elements that operate under an assumption that the person using the device is able (e.g., with guidance from sharp visual focus provided by foveal vision) to accurately see and touch a small target area on a device (e.g., a small target area that is displayed on a touchscreen).

In addition, feedback to the user from such devices typically involves one or more visual elements (e.g., scrolling, pop ups, text, text boxes, highlighting, or some other detailed visual feedback) that operate under an assumption that the user is able to focus his or her foveal vision on a screen of the device (e.g., a touchscreen of the device) and receive visual feedback in sharp focus via foveal vision. Hence, to provide an accurate and satisfying user experience, these kinds of interactions rely upon the user being able to divert his or her center of gaze and at least one hand away from the primary task. This may be problematic in environments where diverting foveal attention from the primary task to the device can be problematic, risky, or dangerous (e.g., operating a vehicle or other machinery).

In accordance with the systems and methodologies discussed herein, a device may be configured to generate and provide a graphical user interface that is specifically designed for use in a person's non-foveal vision. As used herein, the term "non-foveal vision" refers to all vision that is performed outside of foveal vision. Non-foveal vision includes peripheral vision. In some example embodiments, non-vision (e.g., total lack of vision, for example, due to blindness or an obstructed view) may be treated as non-foveal vision for purposes of the methodologies discussed herein. Via a graphical user interface for non-foveal vision, a user may interact with the device (e.g., finding, launching, using, disclosing various software applications, as well as switching between multiple software applications being executed by the device) without focusing his or her foveal vision on the device (e.g., on the touchscreen of the device). Thus, the user may operate the device and its applications entirely and exclusively without using his or her foveal vision (e.g., exclusively using peripheral vision or without any vision whatsoever).

A suitably configured graphical user interface for non-foveal vision may allow a user to control the functions and applications of a device (e.g., mobile device or an embedded device). Such a graphical user interface may be provided by hardware (e.g., by a suitably programmed processor), software (e.g., operating system, middleware, an application, an applet, a mobile app, or browser-executable code), or any suitable combination thereof. According to various example embodiments, a user interface subsystem (e.g., an interface module) presents a graphical user interface that allows the user to submit input (e.g., one or more touch inputs on a touchscreen) to the device, without the user's foveal attention being diverted to a display screen of the device (e.g., the touchscreen). An input detection subsystem (e.g., a detection module) detects the submitted input. The input may trigger, command, or request one or more actions, selections, or changes to graphical elements (e.g., visual elements) displayed on the display screen of the device. A feedback sub-system (e.g., a feedback module) provides a variety of feedback (e.g., one or more acknowledgments) to the user to confirm the submitted input.

A control subsystem (e.g., a control module) executes one or more commands based on the submitted input, thus controlling one or more functions of the device, launching and controlling one or more applications on the device, or otherwise causing the device to behave in accordance with the user-submitted input. One or more of these commands may be explicitly specified by the user input detected by the input detection subsystem. Alternatively, one or more of these commands may be automatically selected and executed based on the user's previous inputs.

FIG. 1 is a network diagram illustrating a network environment 100 in which a server machine 110 may provide a device 130 with software for displaying and utilizing a graphical user interface for non-foveal vision, according to some example embodiments. As shown in FIG. 1, the network environment 100 includes the server machine 110 and devices 130 and 150, all communicatively coupled to each other via a network 190. The server machine 110 may form all or part of a network-based system (e.g., a cloud-based server system configured to provide one or more services to the devices 130 and 150). Accordingly, the server machine 110 may provide software to the device 130, the device 150, or both. Such software may be provided in the form of one or more applications, mobile apps, browser-executable applets, or any suitable combination thereof. Such software, when executed by a device (e.g., device 130), may cause that device to provide, display, and utilize a graphical user interface that operates according to the methodologies discussed herein. The server machine 110 and the devices 130 and 150 may each be implemented in a computer system, in whole or in part, as described below with respect to FIG. 11.

Also shown in FIG. 1 are users 132 and 152. One or both of the users 132 and 152 may be a human user (e.g., a human being) whose field of view (e.g., visual field) includes both foveal vision (e.g., central vision) and non-foveal vision (e.g., peripheral vision). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. The device 130 may be located outside of the foveal vision of the user 132 (e.g., within the peripheral vision of the user 132). This placement of the device 130 may be intentionally arranged or otherwise selected by the user 132 (e.g., due to the user 132 undertaking or otherwise being occupied with a primary task from which the user 132 does not wish to divert his or her foveal vision, such as operating a vehicle or other machinery).

Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152. The device 150 may be located outside of the foveal vision of the user 152 (e.g., within the peripheral vision of the user 152). This placement of the device 150 may be intentionally arranged or otherwise selected by the user 152.

Any of the machines or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
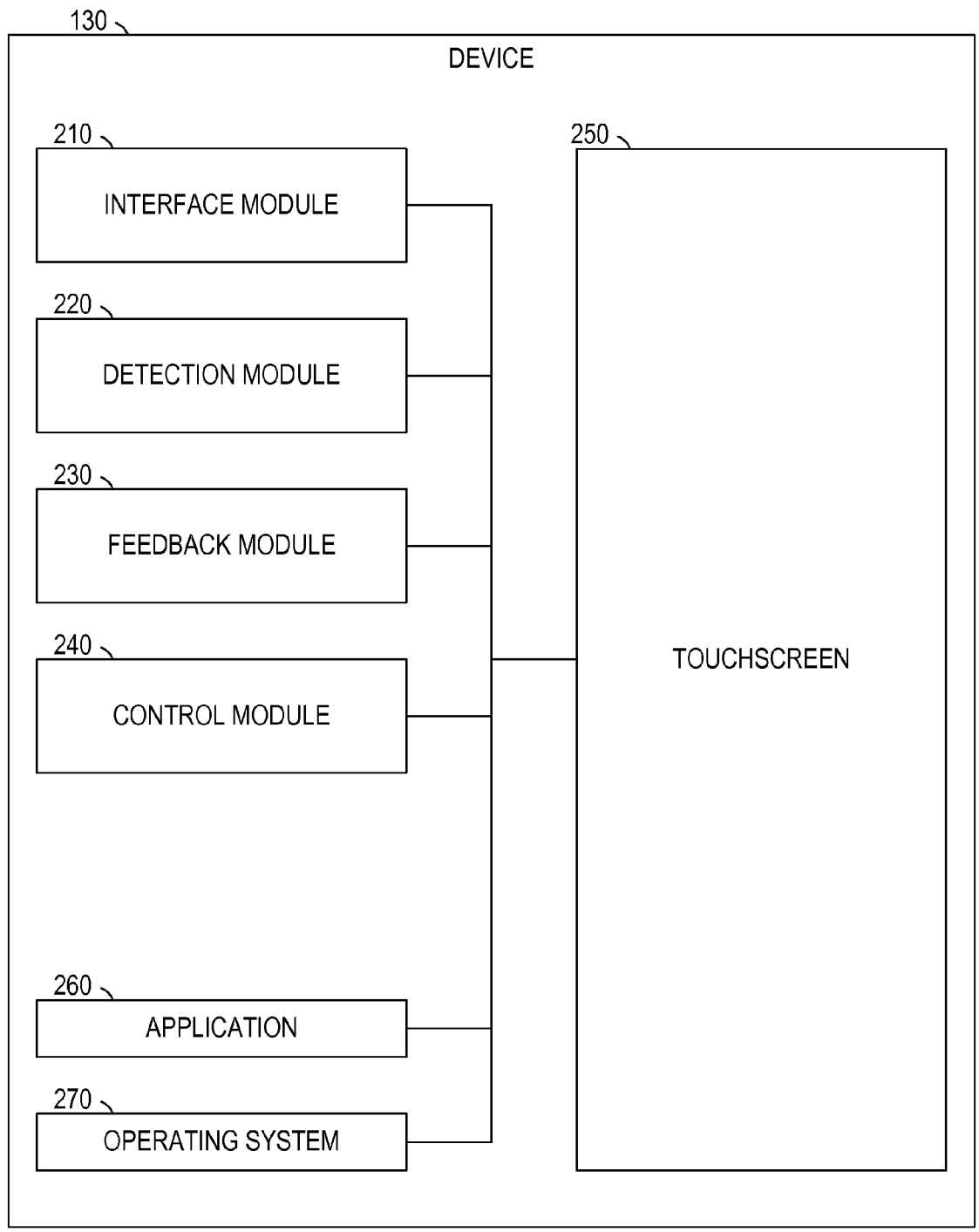
FIG. 2 is a block diagram illustrating components of a device configured for displaying and utilizing a graphical user interface for non-foveal vision, according to some example embodiments.

FIG. 2 is a block diagram illustrating components of the device 130, as configured for displaying and utilizing a graphical user interface for non-foveal vision, according to some example embodiments. Such a configuration may be the result of installation, execution, or other implementation of one or more modules (e.g., software modules, hardware modules, or hybrid modules that include both hardware and software).

The device 130 is shown as including an interface module 210, a detection module 220, a feedback module 230, a control module 240, a touchscreen 250, an application 260 (e.g., a software application, a mobile app, or a browser-executable applet), and an operating system 270 (e.g., a mobile operating system), all configured to communicate with each other (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
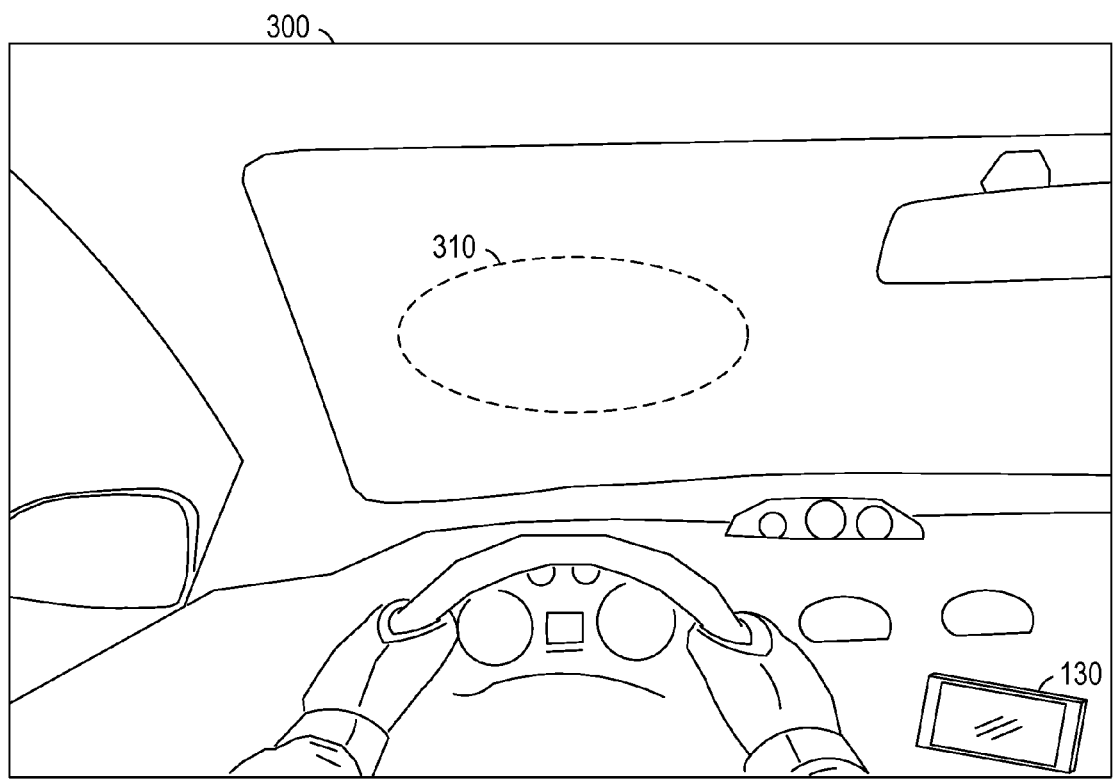
FIG. 3 is a point-of-view diagram illustrating a field of view from the perspective of a user, according to some example embodiments.

FIG. 3 is a point-of-view diagram illustrating a field of view 300 from the perspective of the user 132 (e.g., from a driver's seat within an automobile), according to some example embodiments. Within the field of view 300, a center of gaze 310 represents the outer edges of the foveal vision of the user 132, as the user 132 looks straight ahead with his or her eyes. The center of gaze 310 is fixed to a center region of the field of view 300. Although the user 132 may tilt and pan the field of view 300 (e.g., through eye movements, head movements, or both) and thereby tilt and pan the center of gaze 310, the user 132 may decide, intend, or otherwise desire to avoid or minimize reasons for doing so (e.g., to maximize awareness of objects outside the automobile).

As shown in FIG. 3, the device 130 is outside of the foveal vision of the user 132 by virtue of being located outside of the center of gaze 310. For example, this placement of the device 130 may be intentionally chosen by the user 132 (e.g., by placing the device 130 into a suitably located cradle or charger prior to the user 132 beginning to operate the automobile). Accordingly, the device 130 may be deliberately located within the peripheral vision of the user 132, but still within the field of view 300 of the user 132.

Figure 4:
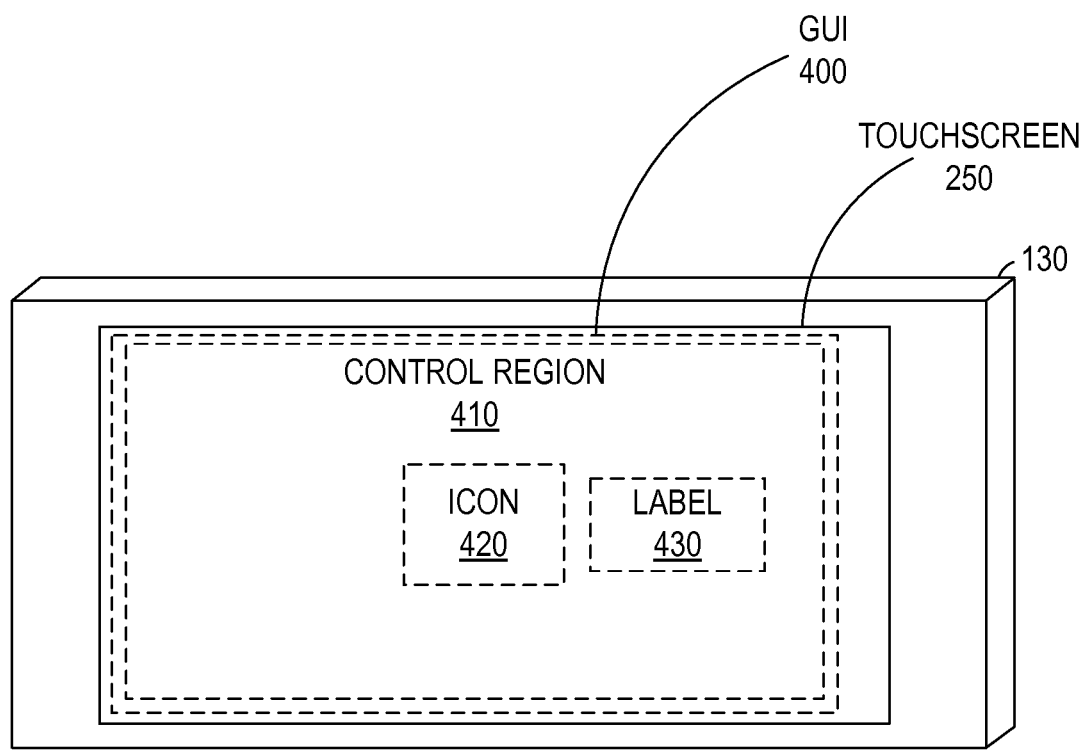
FIG. 4 is a perspective view of the device and its touchscreen, illustrating a graphical user interface for non-foveal vision, according to some example embodiments.

FIG. 4 is a perspective view of the device 130 and the touchscreen 250, illustrating a graphical user interface 400 for non-foveal vision, according to some example embodiments. As shown, the graphical user interface 400 is being displayed on the touchscreen 250 by the device 130. This may be caused by the interface module 210 (e.g., by configuring the device 130 to display the graphical user interface 400 on the touchscreen 250). In some example embodiments, the graphical user interface 400 covers a subset (e.g., a portion) of the touchscreen 250. For example, the graphical user interface 400 may cover at least a third of the viewable area of the touchscreen 250. As additional examples, the graphical user interface 400 may cover three fourths (e.g., 75%) of the viewable area of the touchscreen 250 or the entirety (e.g., 100%) of the viewable area of the touchscreen 250.

The graphical user interface 400 includes a control region 410 (e.g., a target area) that is operable to request execution of a command. The command may be to control one or more functions of the device 130 (e.g., increase audio volume, decrease audio volume, initiate a telephone call, terminate a telephone call, send a text message, or read a received text message), launch software (e.g., application 260) on the device 130 (e.g., start a music playback app or a voice-controlled map app), control software executing on the device 130 (e.g., switch modes or tabs within a mobile app), or otherwise cause the device 130 to behave in accordance with the command. In some example embodiments, the interface module 210 provides the graphical user interface 400 as an alternative to a default graphical user interface provided by software (e.g., one or more mobile apps) that is installed or executing on the device 130. For example, the graphical user interface 400 may include a menu selection interface that supplements or entirely replaces the menu selection interface of a mobile app, such that the mobile app becomes accurately operable despite the device 130 being outside of the foveal vision of the user 132 (e.g., within the peripheral vision of the user 132).

In some example embodiments, the control region 410 is a subset (e.g., a portion) of the graphical user interface 400. For example, the control region 410 may cover at least half (e.g., 50%) of the graphical user interface 400. In certain example embodiments, the control region 410 spans the entirety of the graphical user interface 400. For example, if the graphical user interface 400 covers at least a third of the area of the touchscreen 250, the control region 410 may likewise cover at least the same third of the area of the touchscreen 250. As another example, if the graphical user interface 400 covers at least three fourths of the area of the touchscreen 250, the control region 410 may similarly cover at least the same three fourths of the area of the touchscreen 250. This may have the effect of significantly reducing (e.g., minimizing or eliminating) the amount of visual attention demanded from the user 132, in comparison to small buttons or other control elements designed for operation with full visual attention (e.g., foveal vision) from the user 132.

The control region 410 may have a centroid (e.g., geometric centroid), and this centroid may be indicated by an icon 420. The icon 420 may be a target icon that provides a peripheral vision target for guiding a user input (e.g., in the form of a touch input on the touchscreen 250) to the control region 410. In certain example embodiments, the icon 420 has a visual appearance of a button for requesting execution of a particular command. However, within the graphical user interface 400 for non-foveal vision, the entire control region 410 may operate as the button for requesting execution of the particular command, while the icon 420 functions as a peripheral vision target to guide the user input towards the centroid of the control region 410. In some example embodiments, the icon 420 is located in a non-centroid location to which the user input is to be guided within the control region 410. Thus, the control region 410 enables the user 132 to target a button-like icon (e.g., icon 420) as a start point for the user input, but additionally allows the user input to start from anywhere within the control region 410, without moving the center of gaze 310 towards the touchscreen 250, the control region 410, the icon 420, or any suitable combination thereof.

In some example embodiments, a text label 430 may be included with the icon 420 within the control region 410. Although the user 132 may be unable to clearly read the text label 430, due to the touchscreen 250 being located outside of the center of gaze 310 of the user 132, the text label 430 may provide supplemental functionality. For example, the text label 430 may be read aloud by a voice synthesizer (e.g., a text-to-speech vocal synthesizer) to produce a voice acknowledgment (e.g., a spoken confirmation in the form of a recorded natural human voice or a synthesized human voice) that the control region 410 has been operated by the user input. As another example, the text label 430 may be clearly readable by a different person that is nearby to the user 132 (e.g., a passenger in the automobile) and able to focus his or her own foveal vision on the touchscreen 250.

The control region 410 may operate like a button, a touchpad, or both, in terms of being a target area within which the user 132 may provide a user input. Such a user input may be a touch input, such as a tap (e.g., a touch input at a single location on the touchscreen 250) or a swipe (e.g., a drag between or among multiple locations on the touchscreen 250). According to various example embodiments, one or more parameters by which a touch input is classified as a tap as opposed to a swipe are relaxed (e.g., to be more tolerant of imprecision in entering the user input). This may be performed by the detection module 220 (e.g., by configuring the device 130 to reclassify a swipe that fails to exceed a predetermined threshold distance as a tap).

For example, the operating system 270 of the device 130 may (e.g., by default) treat any swipe that is less than 20 pixels in length as a tap, and the detection module 220 may reclassify any swipe between 20 and 30 pixels in length as a tap, so that all swipes that are less than 30 pixels in length are treated as taps. This may have the effect of providing a more forgiving (e.g., tolerant of motion or vibration) interface for the user 132 to provide input in an environment (e.g., while operating a moving vehicle) where the user 132 is less likely to be precise in providing inputs to the touchscreen 250. Accordingly, the graphical user interface 400 may be used to request execution of various commands solely for the use of non-foveal vision (e.g., peripheral vision, non-vision, or any suitable combination thereof).

Figure 5:
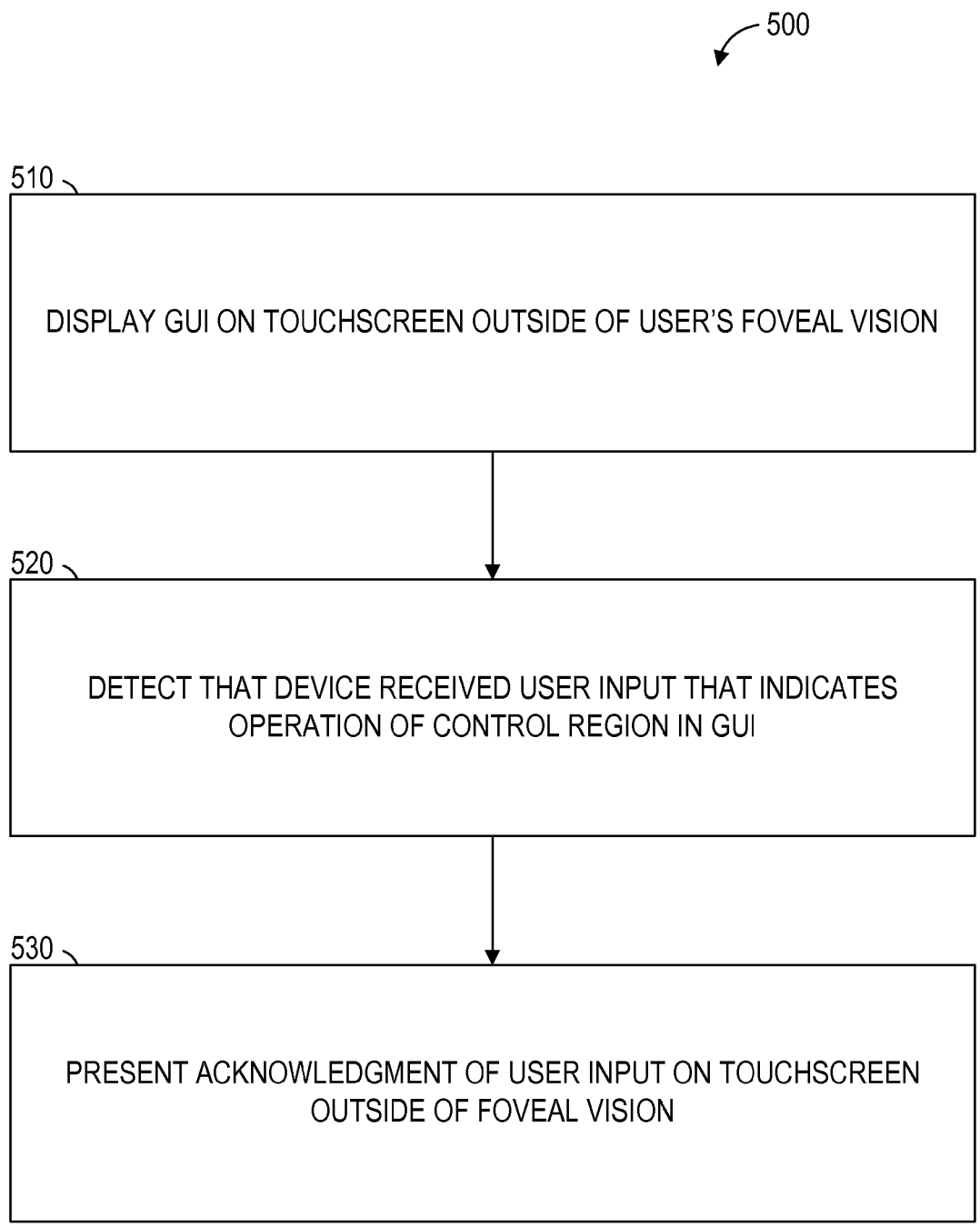
FIGS. 5-7 are flowcharts illustrating operations of the device in performing a method of displaying and utilizing a graphical user interface for non-foveal vision, according to some example embodiments.
Figure 6:
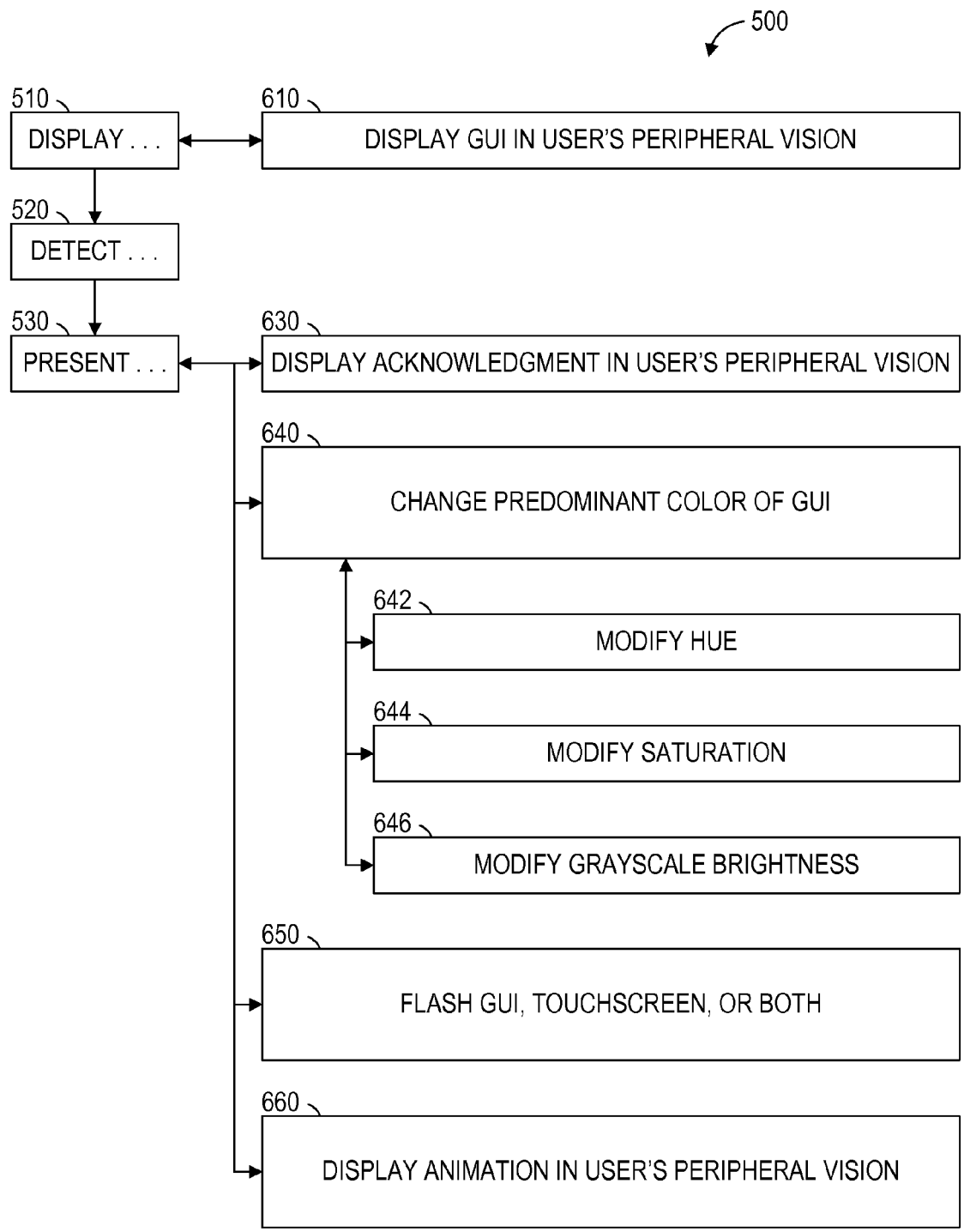
Figure 7:
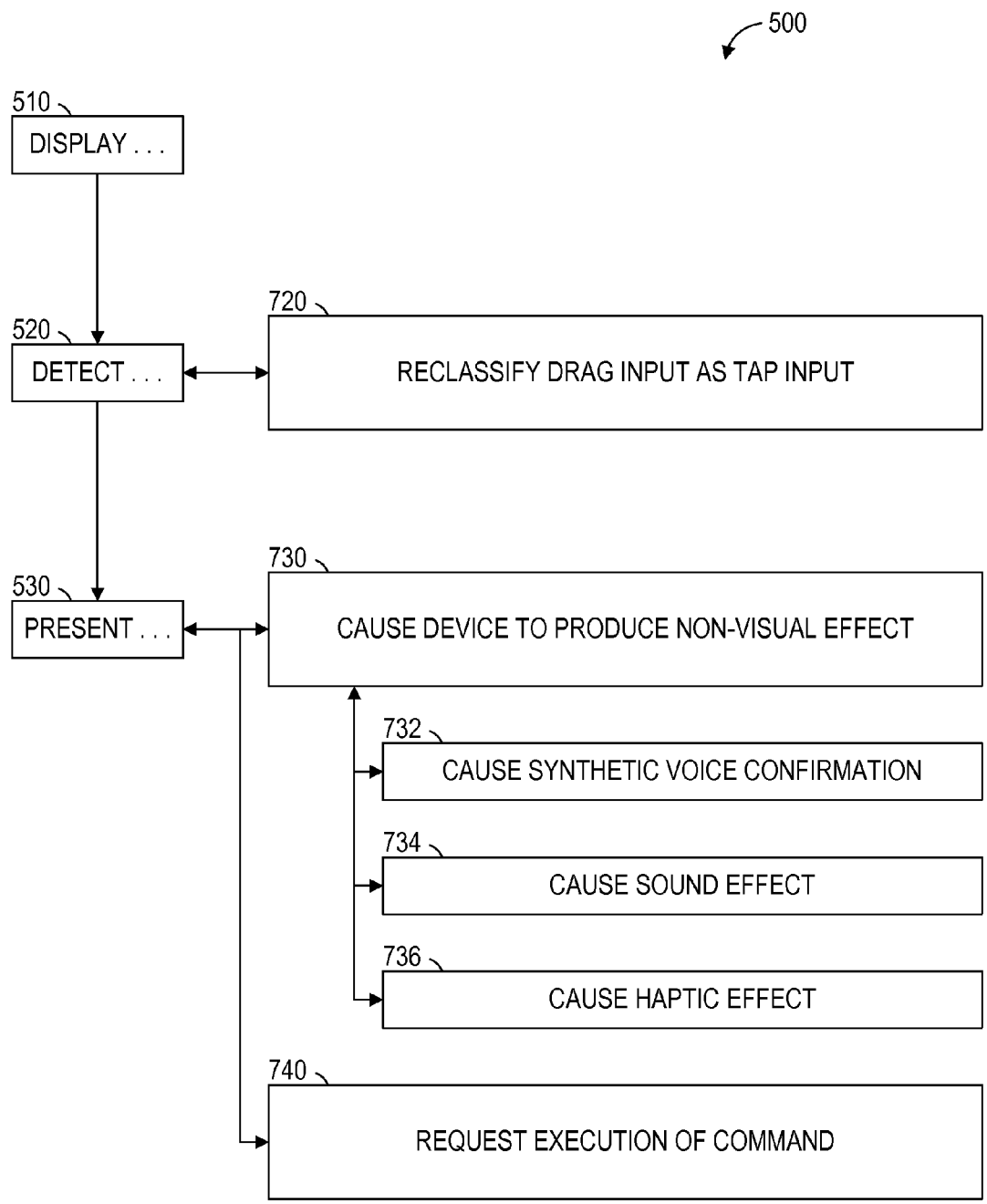

FIGS. 5-7 are flowcharts illustrating operations of the device 130 in performing a method 500 of displaying and utilizing the graphical user interface 400 for non-foveal vision, according to some example embodiments. Operations in the method 500 may be performed by the device 130, using modules described above with respect to FIG. 2. As shown in FIG. 5, the method 500 includes operations 510, 520, and 530.

In operation 510, the interface module 210 displays the graphical user interface 400 on the touchscreen 250. As noted above, the touchscreen 250 (e.g., along with one or more other components of the device 130) may be outside of the foveal vision of the user 132 (e.g., beyond the boundaries of the center of gaze 310 of the user 132). Accordingly, the displaying of the graphical user interface 400 in operation 510 may likewise be outside of the foveal vision of the user 132. As previously noted, the displayed graphical user interface 400 may include the control region 410, which may be operable to request execution of a command (e.g., at the device 130, by the device 130, by the application 260 executing on the device 130, or any suitable combination thereof). Moreover, the command may be to control one or more functions of the device 130, begin execution of software on the device 130, control software being executed on the device 130, or otherwise cause the device 130 to behave in accordance with the command.

In operation 520, the detection module 220 detects that the device 130 (e.g., via the touchscreen 250) received a user input that indicates operation of the control region 410 to request execution of the command. For example, the detection module 220 may detect a touch input (e.g., a tap, a swipe, or a swipe reclassified as a tap) on the touchscreen 250 of the device 130, and such a touch input may indicate that the control region 410 has been operated to request the execution of the command. In some example embodiments, the detection module 220 recognizes a start point, a direction, and a traced distance of the touch input on the touchscreen 250 and accordingly detects that the user input is has been entered by the user 132 and received by the device 130.

In operation 530, the feedback module 230 presents an acknowledgment of the user input that was detected in operation 520. The acknowledgment may be presented on the touchscreen 250. Since the touchscreen 250 (e.g., along with one or more of the components of the device 130) may be outside of the foveal vision of the user 132, the presenting of the acknowledgment in operation 530 may similarly be outside of the foveal vision of the user 132 (e.g., beyond the boundaries of the center of gaze 310 of the user 132).

As shown in FIG. 6, the method 500 may include one or more of operations 610, 630, 640, 650, and 660. In some example embodiments, the touchscreen 250 is beyond all vision of the user 132 (e.g., behind the head of the user 132, inside a coat pocket, or otherwise obscured from view or out of view). In alternative example embodiments, however, the touchscreen 250 is within the field of view 300 of the user 132 but nonetheless outside of the foveal vision of the user 132 (e.g., outside of the center of gaze 310). In such alternative example embodiments, the touchscreen 250 may be entirely and exclusively within the peripheral vision of the user 132, and operation 610 may be performed as part (e.g., a precursor task, a subroutine, or a portion) of operation 510, in which the interface module 210 presents the graphical user interface 400 on the touchscreen 250. In operation 610, the interface module 210 displays the graphical user interface 400 entirely and exclusively within the peripheral vision of the user 132 (e.g., still within the field of view 300, but beyond the center of gaze 310).

As shown in FIG. 6, one or more of operations 630, 640, 650, and 660 may be performed as part of operation 530, in which the feedback module 230 presents the acknowledgment of the user input detected in operation 520.

In some example embodiments, the touchscreen 250 is entirely and exclusively within the peripheral vision of the user 132, and in operation 630, the feedback module 230 accordingly displays the acknowledgment entirely and exclusively within the peripheral vision of the user 132 on the touchscreen 250. The contents of this acknowledgment may include visual content (e.g., visible content), non-visual content (e.g., non-visible content, such as acoustic content or haptic content), or any suitable combination thereof.

In operation 640, the feedback module 230 changes the predominant color of the graphical user interface 400. For example, the graphical user interface 400 may have a predominant color that is a first color (e.g., dark red) prior to operation 520 (e.g., during operation 510), and the feedback module 230 may recolor the graphical user interface 400 from the first color (e.g., dark red) to a second color (e.g., light blue) that is easily distinguishable from the first color. That is, the second color may be chosen to strongly contrast with the first color. This change in the predominant color may be performed in response to the detecting of the user input in operation 520. The predominant color of the graphical user interface 400 may be a color (e.g., as specified by three or more values of independent color components within a multi-dimensional color space) that is applied to a majority of the graphical user interface 400 (e.g., in terms of pixels, area covered, or both). As one example, the predominant color may be exhibited by at least half of the graphical user interface 400 (e.g., at least 50% of its pixels).

In particular, this change (e.g., transition) in the predominant color of the graphical user interface 400 is sufficiently distinct to be recognizable by the user 132 through peripheral vision alone, without use of foveal vision. According to various example embodiments, the changing of the predominant color includes changing the hue (e.g., perceived color) of the predominant color, the saturation (e.g., colorfulness or intensity) of the predominant color, the brightness (e.g., grayscale brightness or lightness) of the predominant color, or any suitable combination thereof. In some example embodiments, operation 640 includes modifying at least two of these parameters (e.g., hue and saturation together, hue and brightness together, or saturation and brightness together). Furthermore, one or more of these parameters may be modified by a predetermined percentage. In some situations, the same predetermined percentage is used for multiple parameters. Accordingly, one or more of operations 642, 644, and 646 may be performed as part of operation 640.

In operation 642, the feedback module 230 modifies the hue of the first color to obtain the second color. For example, the hue of the first color may be modified by at least a first predetermined percentage (e.g., a 25% increase or decrease) to calculate the hue of the second color.

In operation 644, the feedback module 230 modifies the saturation of the first color to obtain the second color. As an example, the saturation of the first color may be modified by at least a second predetermined percentage (e.g., a 30% increase or decrease) to calculate the saturation of the second color.

In operation 646, the feedback module 230 modifies the brightness of the first color to obtain the second color. For example, the brightness of the first color may be modified by at least a third predetermined percentage (e.g., a 35% increase or decrease) to calculate the brightness of the second color.

In operation 650, the feedback module 230 causes the graphical user interface 400, the touchscreen 250, or both, to flash. This flashing of the graphical user interface 400, the touchscreen 250, or both, may be performed prior to operation 640, after operation 640, or both (e.g., once before changing the predominant color of the graphical user interface 400 and again after changing the predominant color). For any given instance, a flashing of the graphical user interface 400, the touchscreen 250, or both, may include turning all affected pixels white for a predetermined period of time (e.g., 60 milliseconds), turning all affected pixels black for a predetermined period of time (e.g., 55 milliseconds), or both (e.g., white for 40 milliseconds, then black for 40 milliseconds), before returning the affected pixels to normal operation. In some example embodiments, the flashing of the graphical user interface 400 causes all affected pixels to temporarily become lighter. In certain example embodiments, the flashing of the graphical user interface 400 causes all affected pixels to temporarily become darker.

In some example embodiments, operation 640 is performed using calculations in the red-green-blue (RGB) color space. As an example, the color white may be represented as a triplet of RGB values (e.g., 255, 255, 255); the color black may be represented as another triplet of RGB values (e.g., 0, 0, 0); and the color red may be represented as a further triplet of RGB values (e.g., 255, 0, 0). Regardless of color space, the amount of color change may be quantified by the sum of the absolute value of the color changes in each color component within the color space. For example, the predominant color of the graphical user interface 400 may be changed from a first color (e.g., a shade of purple) that has the RGB values 76, 35, 111 to a second color (e.g., a shade of gray) that has the RGB values 77, 77, 77. In this example, the absolute value of the change in the red component is 1; the absolute value of the change in the green component is 42; and the absolute value of the change in the blue component is 34. Summing these absolute values together, the total color change may be quantified as 77 (1+42+34).

In certain example embodiments, operation 640 includes changing the sum of the absolute values of the changes in each color component by at least a predetermined threshold value (e.g., by at least 25, for a range of 255 possible values per color component or 765 possible values for the sum). Moreover, in various example embodiments, the graphical user interface 400 has more than one color, predominant or otherwise, and performance of operation 640 changes multiple colors (e.g., all of the colors) in the graphical user interface 400 by at least the predetermined threshold value (e.g., 25).

In operation 660, the feedback module 230 displays an animation within the peripheral vision of the user 132 on the touchscreen 250. For example, the icon 420, the label 430, or both, may be animated (e.g., moved, rotated, or distorted) during performance of operation 660. In some example embodiments, one or more graphical elements (e.g., the icon 420 or the label 430) that occupy at least 1% of the area of the control region 410 may be animated. Examples of such animation include linear movement (e.g., by at least 5% of the length of the touchscreen 250, horizontally, vertically, or both, including bouncing or shaking), rotation (e.g., by at least 15° of arc clockwise or counterclockwise), distortion (e.g., expansion or shrinkage by at least 20%), changes in opacity (e.g., by at least 25%), and any suitable combination thereof. Moreover, the animation may provide a visual appearance of the one or more graphical elements (e.g., the icon 420) being shaken, vibrated, spun, twirled, or any suitable combination thereof.

As shown in FIG. 7, the method 500 may include one or more of operations 720, 730, and 740. Operation 720 may be performed as part of operation 520, in which the detection module 220 detects that the device 130 received the user input that indicates operation of the control region 410 to request execution of the command. In operation 720, the detection module 220 reclassifies a swipe input (e.g., a drag input) as a tap input. This reclassification may be performed based on the swipe input failing to exceed a predetermined threshold distance on the touchscreen 250 of the device 130. In some example embodiments, this predetermined threshold distance is determined (e.g., tactilely) based on a default threshold distance implemented within the operating system 270 of the device 130 (e.g., 60% longer than the default threshold distance). As noted above, in some example embodiments, the operating system 270 of the device 130 may treat any swipe that is less than 20 pixels in length as a tap and treat any swipe that is 20 pixels or longer as a swipe. In such example embodiments, the detection module 220 may reclassify any swipe between 20 and 30 pixels in length as a tap, so that all swipes that are less than 30 pixels in length are treated as taps. This may result in the graphical user interface 400, the control region 410, or both, being more tolerant of imprecision in entering the user input compared to the default operation of the device 130 (e.g., as configured by the operating system 270 of the device 130).

One or more of operations 730 and 740 may be performed as part of operation 530, in which the feedback module 230 presents the acknowledgment of the user input detected in operation 520. In operation 730, the feedback module 230 causes the device 130 to produce a non-visual effect (e.g., one or more non-visual effects) that acknowledges the user input. Operation 730 may be performed in situations where the touchscreen 250 is within the peripheral vision of the user 132 (e.g., in conjunction with one or more visual effects, such as those described above with respect to operation 630, 640, and 650). In some alternative example embodiments, operation 730 may be performed in situations where the touchscreen 250 is not visible to the user 132 (e.g., hidden from view by one or more obstructions, or otherwise outside the field of view 300 of the user 132). In these alternative example embodiments, operation 730 may initiate the only feedback perceived or otherwise experienced by the user 132 to acknowledge the user input detected in operation 520.

One or more of operations 732, 734, and 736 may be performed as part of operation 730, in which the feedback module 230 causes the device 130 to produce a non-visual effect that acknowledges the user input. The non-visual effect may correspond to the command whose execution is requested by the operation of the control region 410, as indicated by the user input, and the non-visual effect may identify the user input among multiple user inputs that are available to be received by the device 130 (e.g., via the touchscreen 250). Examples of the non-visual effect include a voice confirmation (e.g., audio readout in the form of a recorded natural human voice or a synthesized human voice), a sound effect (e.g., playback of an audio file), and a haptic effect (e.g., vibrations or a pattern thereof).

In operation 732, the feedback module 230 causes the device 130 to produce a voice confirmation of the user input. For example, the feedback module 230 may cause a voice synthesizer (e.g., a text-to-speech module or app) of the device 130 to read the text label 430 of the control region 410 as a confirmation that the control region 410 has been operated by the user input. In some example embodiments, the text label 430 is or includes a title or name of the command whose execution is being requested by operation of the control region 410. Thus, performance of operation 732 may trigger an audio readout of such a title or name for the command.

In certain example embodiments, the voice confirmation is or includes a machine-spoken instruction, recommendation, or suggestion for the user 132 to take one or more actions related to the requested execution of the command (e.g., an action to be performed in conjunction with the requested execution of the command). In various example embodiments, the voice confirmation further contains additional information regarding the command, regarding operation of the graphical user interface 400 (e.g., for controlling the device 130 or software installed or executing thereon), or both.

In operation 734, the feedback module 230 causes the device 130 to produce a sound effect (e.g., playback of one or more audio files) that confirms, acknowledges, or otherwise indicates that the user input has been detected. According to some example embodiments, the sound effect is or includes a brief sound effect (e.g., a chime, a buzz, a musical note, a beat of a drum, or any suitable combination thereof) that corresponds to the detected user input. Depending on the command whose execution is requested by operation of the control region 410, one or more of various sound effects may indicate different types of information. For example, the produced sound effect may indicate that a user-configurable setting is being changed on the device 130, the audio volume of the device 130 is being increased, the audio volume of the device 130 is being decreased, or the requested command cannot be executed (e.g., to indicate that a scrollable set of menus cannot be scrolled any further it in a particular direction requested by the user input).

In operation 736, the feedback module 230 causes the device 130 to produce a haptic effect (e.g., one or more tactilely perceivable effects) that confirms, acknowledges, or otherwise indicates that the user input has been detected. For example, the haptic effect is or includes one or more tactilely perceivable vibrations or a pattern thereof (e.g., produced by an eccentrically mounted weight being spun by an electric motor within the device 130). This may have the effect of providing the user 132 with a physically felt indication that the user input has been detected. Moreover, this physically felt indication may be perceivable by the user 132 without any visual attention (e.g., foveal or peripheral) being redirected to the touchscreen 250 of the device 130.

In operation 740, the control module 240 requests execution of the command whose execution was requested by the operation of the control region 410, as indicated by the user input detected in operation 520. For example, the control module 240 may send a request to the application 260 that the application 260 cause the device 130 to execute the command. As another example, the control module 240 may send a request to the operating system 270 of the device 130 and thus request that the device 130 execute the command.

Accordingly, performance of operation 740 may enable the user 132 to issue one or more commands to the device 130 without ever looking directly at the touchscreen 250 of the device 130. Thus, the user 132 is enabled to control one or more functions of the device 130, begin execution of software on the device 130, control software being executed on the device 130, or otherwise cause the device 130 to behave in accordance with these commands, while the touchscreen 250 is outside of the foveal vision of the user 132 (e.g., within the peripheral vision of the user 132 or outside of the field of view 300 of the user 132). As a result of these commands, the user 132 may control any aspect of the device 130 (e.g., the operating system 270, a hardware component of the device 130, user-configurable settings, or the internal state of any software installed or executing on the device 130). Moreover, the use of such commands may enable the user 132 to change the state of the device 130 by interacting with one or more systems that are external to the device 130 (e.g., interacting with one or more online services that are accessible by the device 130 via the network 190).

In some example embodiments, execution of one or more of such commands causes the device 130 to switch from one function to another, switch from one application (e.g., application 260) to another, send one or more specific commands to the application 260 or the operating system 270, or any suitable combination thereof. This switching may occur entirely outside of the foveal vision of the user 132 (e.g., within the peripheral vision of the user 132 or outside of the field of view 300 of the user 132). Moreover, each instance of such switching may be acknowledged, confirmed, or otherwise indicated by performance of operation 530 (e.g., with performance of one or more of operations 630, 640, 650, and 730).

In certain example embodiments, the display and usage of the graphical user interface 400 by the user 132 may involve displaying and using a sequence of multiple control regions (e.g., control region 410) to request execution of a sequence of multiple commands. For example, a menu structure (e.g., a set of menu options or menu screens) may be navigated and operated by the user 132 through use of such control regions within the graphical user interface 400. Such a menu structure may be a native or default menu structure of the device 130 (e.g., as set forth by the operating system 270 of the device 130), a native or default menu structure of the application 260, or an alternative (e.g., replacement) menu structure for either or both (e.g., as provided by the application 260, a mobile app, or a browser-executable applet). In particular, an instance (e.g., an iteration) of the method 500 may be executed each time the user 132 navigates to a different menu option or menu screen within the menu structure. Moreover, each instance of the method 500 may acknowledge each requested command by causing the device 130 to play a sound effect, display a bold color transition on the touchscreen 250, produce an audio readout of a title of the command, and produce tactile feedback in acknowledgment of the requested command. This may have the effect of enabling the user 132 to understand what command was requested, without looking at the touchscreen 250 of the device 130.

Figure 8:
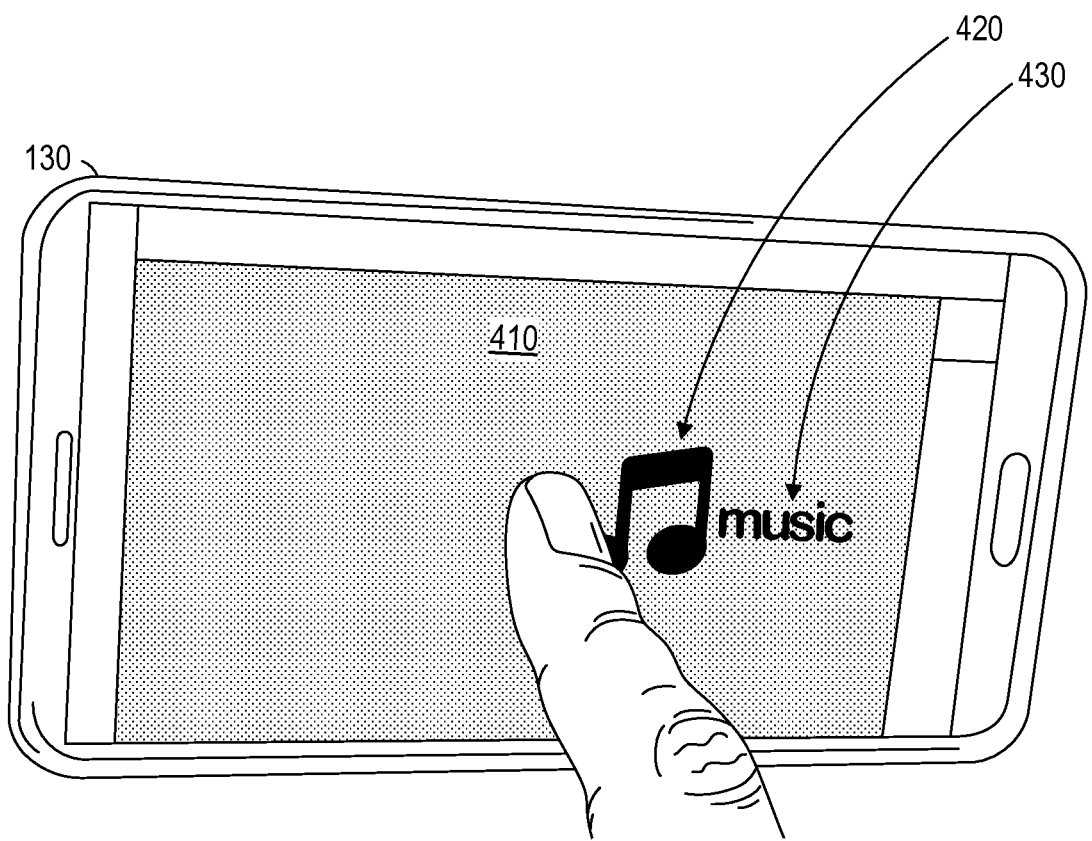
FIGS. 8-10 are face views of the device, illustrating a sequence of user interactions with a graphical user interface for non-foveal vision, according to some example embodiments.
Figure 9:
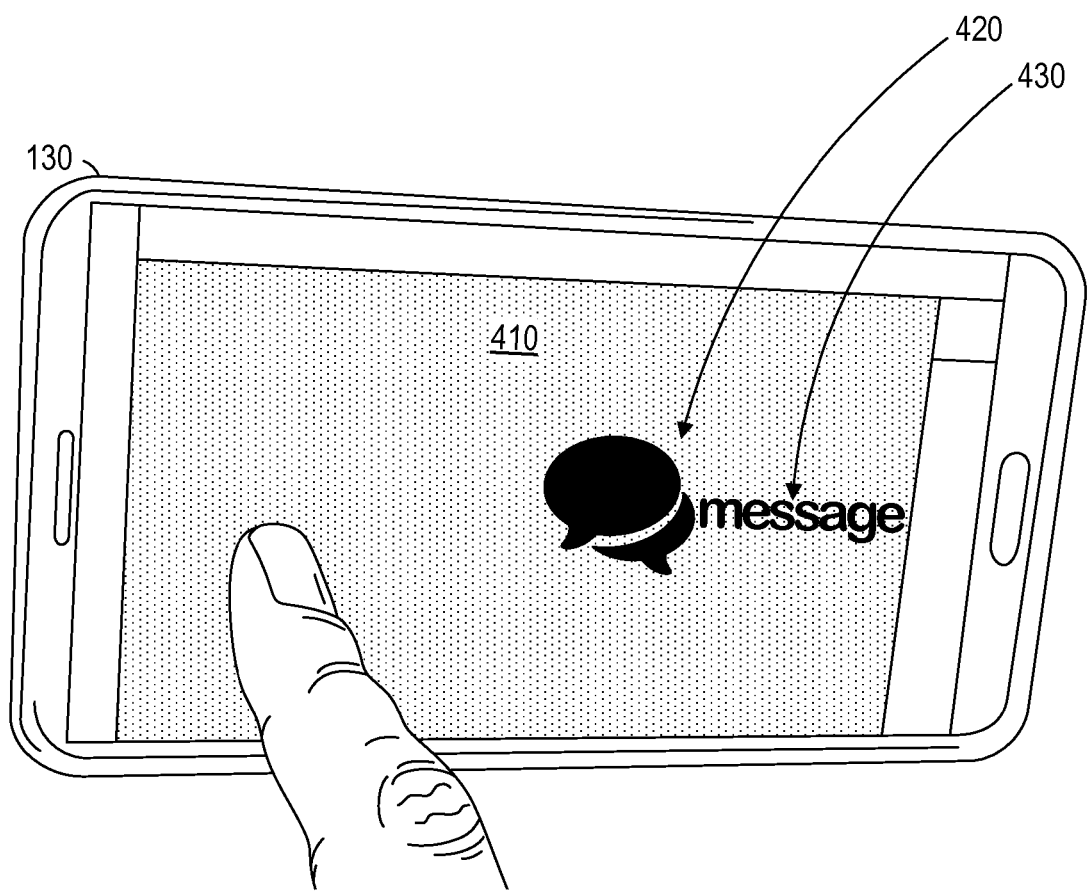
Figure 10:
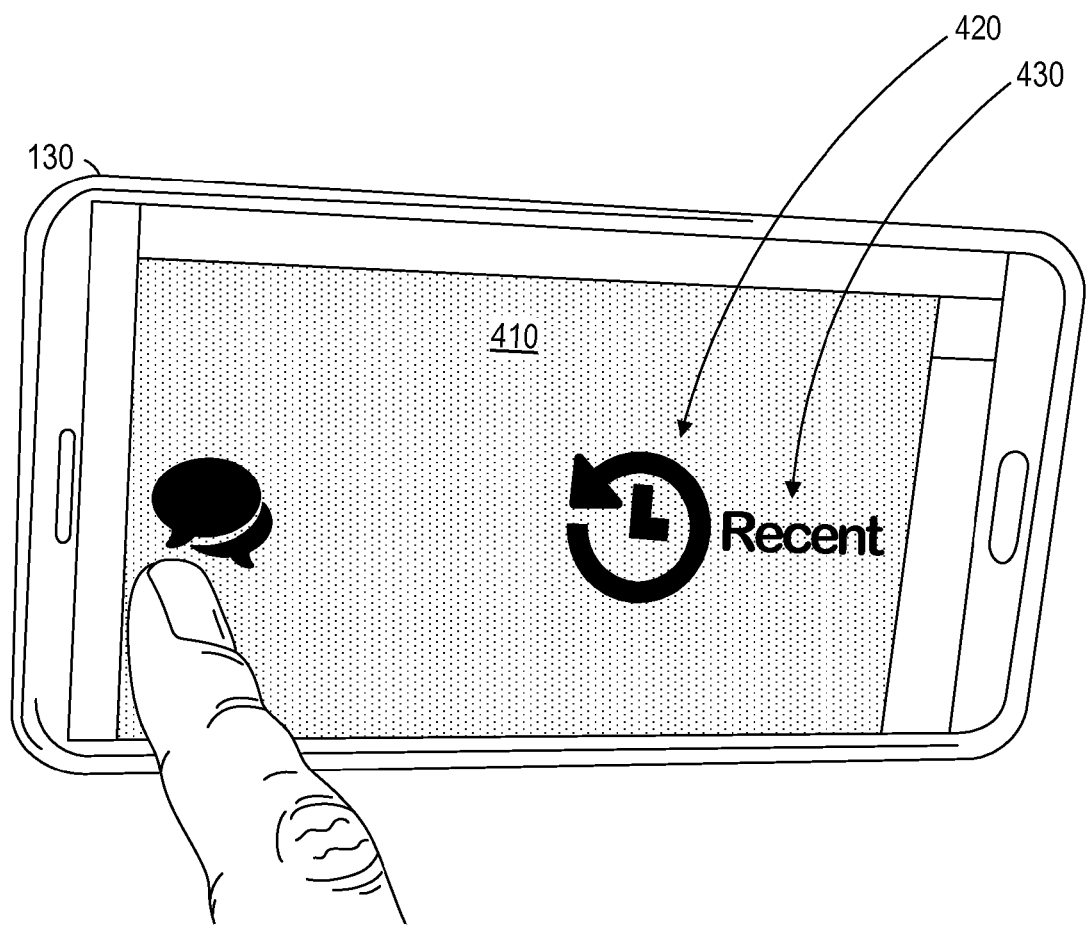

FIGS. 8-10 are face views of the device 130, illustrating a sequence of interactions by the user 132 with the graphical user interface 400, according to some example embodiments. As shown in FIG. 8, the user 132 may navigate through one or more main functions of the device 130 (e.g., via one or more instances of the method 500). For example, vertical swipes in control regions (e.g., control region 410) may switch (e.g., scroll or cycle) among various commands to trigger respectively corresponding functions of the device 130, while a tap or a horizontal swipe (e.g., a rightward swipe) may select a displayed command (e.g., "message") for execution.

As shown in FIG. 9, the user 132 may experience (e.g., via peripheral vision, touch, hearing, or any suitable combination thereof) one or more indications that the displayed command (e.g., "message") has been selected for execution. These indicators may form all or part of the acknowledgment presented in operation 530.

As shown in FIG. 10, after the user 132 has selected the display command (e.g., "message"), the graphical user interface 400 may display a further control region (e.g., similar to the control region 410) for further navigation through the menu structure. For example, the further control region may be displayed as a sub-menu option or a sub-menu screen. In some example embodiments, a vertical swipe on the further control region may cause the graphical user interface 400 to display a different command (e.g., "recent") that is available for execution, and a tap or a horizontal leftward swipe may select the currently displayed command (e.g., "recent") for execution. Furthermore, a horizontal rightward swipe may cause the graphical user interface 400 to navigate back to the previously displayed command (e.g., "message"). In some example embodiments, a rightward horizontal swipe causes the graphical user interface 400 to display a menu option or a menu screen from a different (e.g., higher) layer within a multi-layer menu structure.

Figure 11:
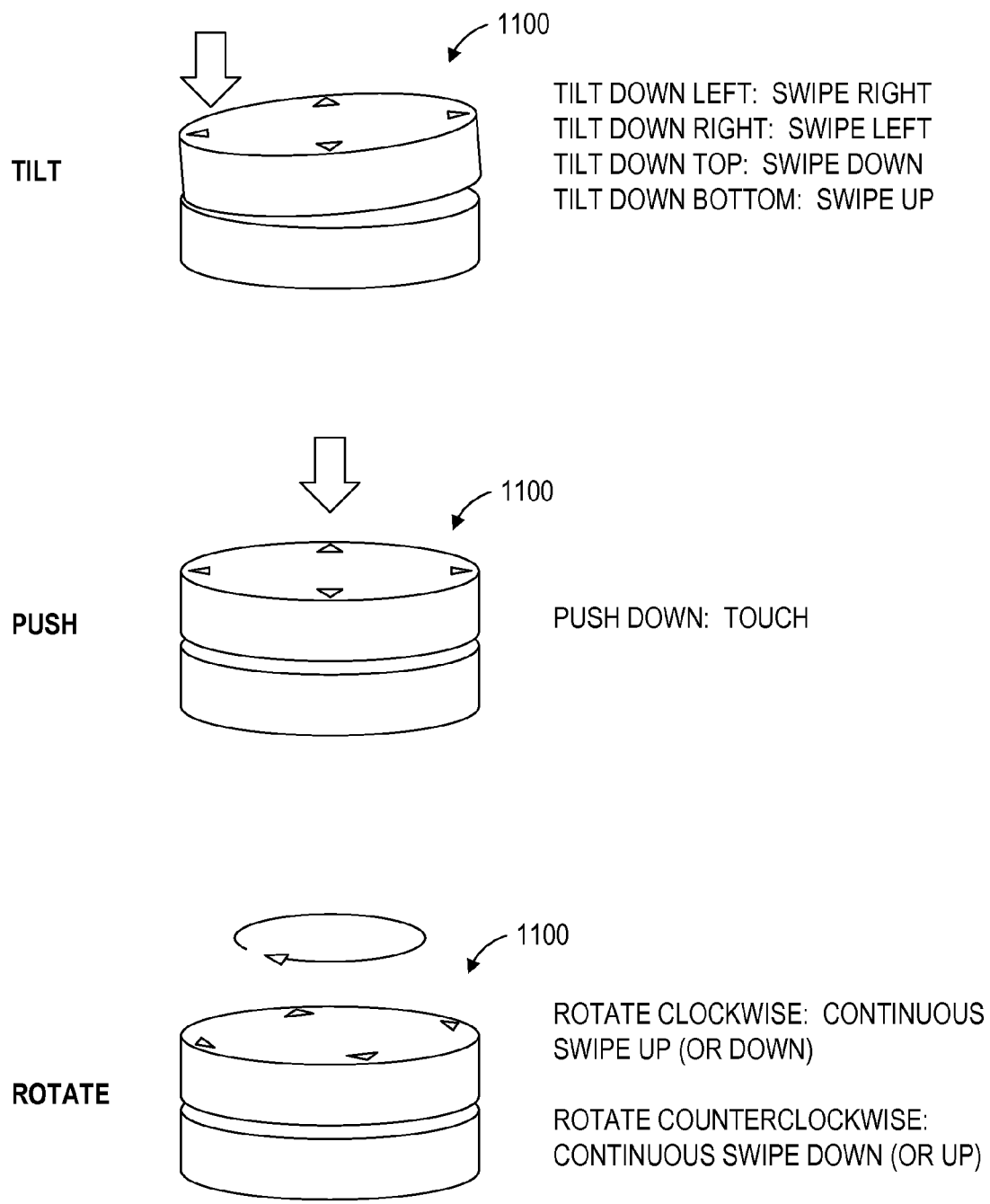
FIG. 11 is a conceptual diagram showing an alternative input device, according to some example embodiments.

FIG. 11 is a conceptual diagram showing an alternative input device in the example form of a controller 1100 (e.g., in the form of a knob). According to certain example embodiments, the functionality described herein for the touchscreen 250 may be divided into display functions and input functions, and these display functions and input functions may be performed separately by separate devices. For example, the display functions may be performed by a display screen (e.g., a touch-sensitive or non-touch sensitive video monitor or other display screen) that is part of the device 130, and the input functions may be performed by the controller 1100 (e.g., a touch-sensitive pad, a trackball, a joystick, a keypad, or an array of one or more switches). In some example embodiments, the controller 1100 forms all or part of a wearable device (e.g., a smartwatch, an armband device, a torso-mounted device, a thigh-mounted device, a shoe-mounted device, an anklet device, a smartglove, a head-mounted device, or any suitable combination thereof). For clarity, the touchscreen 250 is described herein as fulfilling both roles. However, in certain example embodiments, the display screen is located outside of the foveal vision of the user 132, while the separate controller 1100 is located anywhere within reach of the user 132 (e.g., within the foveal vision of the user 132 or outside of the foveal vision of the user 132, including within the peripheral vision of the user 132 or entirely out of sight). The controller 1100 may be part of the device 130 or communicatively coupled to the device 130 by a wired connection, wireless connection, or both.

In some example embodiments, the controller 1100 may be or include a touchscreen input emulator configured to communicate at least four types of movement input (e.g., corresponding to four directions: up, down, left, and right) and a selection input (e.g., to select a displayed menu or other displayed option). For example, the controller 1100 may be configured to detect (1) a tilt-down left movement (e.g., translated as a rightward swipe), (2) a tilt-down right movement (e.g., translated as a leftward swipe), (3) a tilt-down top movement (e.g., translated as a downward swipe), (4) a tilt-down bottom movement (e.g., translated as an upward swipe), (5) a push-down or center-press movement (e.g., translated as a tap or a selection), (6) a clockwise rotation (e.g., translated as a continuously repeating series of upward or downward swipes), and (7) a counterclockwise rotation (e.g., translated as a continuously repeating series of downward or upward swipes).

According to various example embodiments, the controller 1100 simulates touch input (e.g., a tap or a swipe) on the control region 410. To do this, the controller 1100 may detect movement by a body member (e.g., a finger or hand) of the user 132 by physical contact, by motion detection (e.g., via a video camera, a sensor, or both), or by any suitable combination thereof. The controller 1100 may be placed near the user 132 (e.g., within reach of the user 132), held in a hand of the user 132, or attached to the body of the user 132 (e.g., worn on a hand, head, finger, wrist, or other body part).

According to various example embodiments, one or more of the methodologies described herein may facilitate presentation and utilization of a graphical user interface for non-foveal vision (e.g., graphical user interface 400). Moreover, one or more of the methodologies described herein may enable a user (e.g., user 132) to navigate a menu structure without using his or her foveal vision (e.g., without diverting his or her foveal vision from an ongoing primary task). Hence, one or more of the methodologies described herein may facilitate controlling a device (e.g., device 130) or software that is installed or executing thereon, without directly looking at the device (e.g., via peripheral vision or non-vision).

When these effects are considered in aggregate, one or more of the methodologies described herein may obviate a need for certain efforts or resources that otherwise would be involved in providing a graphical user interface (e.g., graphical user interface 400) for non-foveal vision. Efforts expended by a user (e.g., user 132) in navigating a menu structure or reducing risks associated with navigating the menu structure while engaging in a vision-critical task may be reduced by one or more of the methodologies described herein. Computing resources used by one or more machines, databases, or devices (e.g., within the network environment 100) may similarly be reduced. Examples of such computing resources include additional hardware components (e.g., within the device 130), processor cycles, network traffic, memory usage, data storage capacity, power consumption, and cooling capacity.

Figure 12:
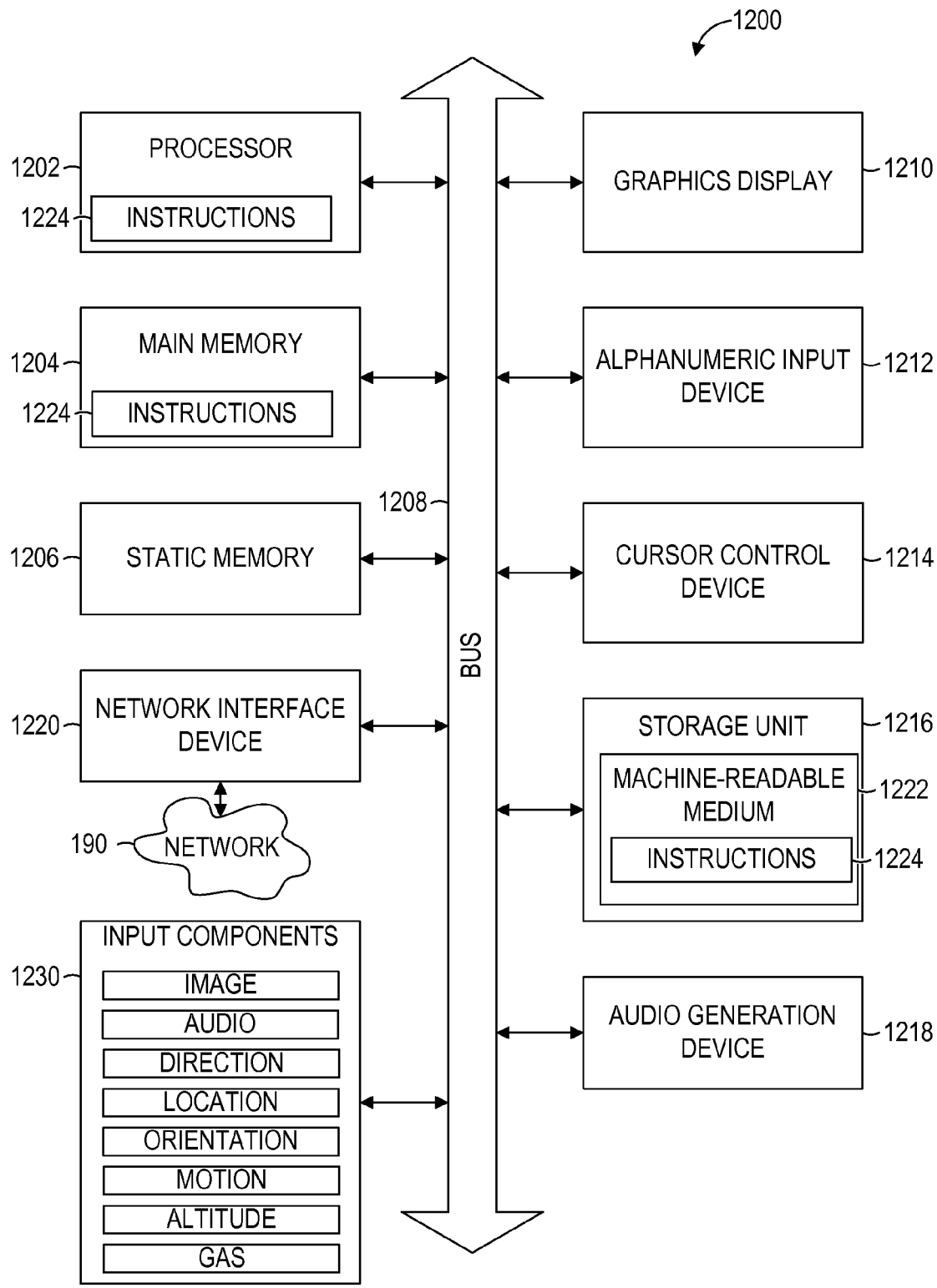
FIG. 12 is a block diagram illustrating components of a machine, according to some example embodiments, able to read instructions from a machine-readable medium and perform any one or more of the methodologies discussed herein.

FIG. 12 is a block diagram illustrating components of a machine 1200, according to some example embodiments, able to read instructions 1224 from a machine-readable medium 1222 (e.g., a non-transitory machine-readable medium, a machine-readable storage medium, a computer-readable storage medium, or any suitable combination thereof) and perform any one or more of the methodologies discussed herein, in whole or in part. Specifically, FIG. 12 shows the machine 1200 in the example form of a computer system (e.g., a computer) within which the instructions 1224 (e.g., software, a program, an application, an applet, an app, or other executable code) for causing the machine 1200 to perform any one or more of the methodologies discussed herein may be executed, in whole or in part.

In alternative embodiments, the machine 1200 operates as a standalone device or may be communicatively coupled (e.g., networked) to other machines. In a networked deployment, the machine 1200 may operate in the capacity of a server machine or a client machine in a server-client network environment, or as a peer machine in a distributed (e.g., peer-to-peer) network environment. The machine 1200 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include any collection of machines that individually or jointly execute the instructions 1224 to perform all or part of any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The processor 1202 may contain microcircuits that are configurable, temporarily or permanently, by some or all of the instructions 1224 such that the processor 1202 is configurable to perform any one or more of the methodologies described herein, in whole or in part. For example, a set of one or more microcircuits of the processor 1202 may be configurable to execute one or more modules (e.g., software modules) described herein.

The machine 1200 may further include a graphics display 1210 (e.g., a plasma display panel (PDP), a light emitting diode (LED) display, a liquid crystal display (LCD), a projector, a cathode ray tube (CRT), or any other display capable of displaying graphics or video). The machine 1200 may also include an alphanumeric input device 1212 (e.g., a keyboard or keypad), a cursor control device 1214 (e.g., a mouse, a touchpad, a trackball, a joystick, a motion sensor, an eye tracking device, or other pointing instrument), a storage unit 1216, an audio generation device 1218 (e.g., a sound card, an amplifier, a speaker, a headphone jack, or any suitable combination thereof), and a network interface device 1220.

The storage unit 1216 includes the machine-readable medium 1222 (e.g., a tangible and non-transitory machine-readable storage medium) on which are stored the instructions 1224 embodying any one or more of the methodologies or functions described herein. The instructions 1224 may also reside, completely or at least partially, within the main memory 1204, within the processor 1202 (e.g., within the processor's cache memory), or both, before or during execution thereof by the machine 1200. Accordingly, the main memory 1204 and the processor 1202 may be considered machine-readable media (e.g., tangible and non-transitory machine-readable media). The instructions 1224 may be transmitted or received over the network 190 via the network interface device 1220. For example, the network interface device 1220 may communicate the instructions 1224 using any one or more transfer protocols (e.g., hypertext transfer protocol (HTTP)).

In some example embodiments, the machine 1200 may be a portable computing device, such as a smart phone or tablet computer, and have one or more additional input components 1230 (e.g., sensors or gauges). Examples of such input components 1230 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1224 for execution by the machine 1200, such that the instructions 1224, when executed by one or more processors of the machine 1200 (e.g., processor 1202), cause the machine 1200 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments define various example embodiments of methods, machine-readable media, and systems (e.g., device or apparatus) discussed herein:

A first embodiment provides a method (e.g., method 500) comprising:
at a device (e.g., device 130) outside of foveal vision (e.g., center of gaze 310) of a user (e.g., user 132) of the device, displaying a graphical user interface (e.g., graphical user interface 400) on a touchscreen (e.g., touchscreen 250) of the device outside of the foveal vision of the user, the displayed graphical user interface including a control region (e.g., control region 410) that is operable to request execution of a command;
detecting that the device received a user input that indicates operation of the control region to request execution of the command; and
at the device outside of the foveal vision of the user, presenting an acknowledgment of the user input on the touchscreen outside of the foveal vision of the user, the presenting of the acknowledgment being performed by a processor of a machine (e.g., by a processor of the device).

A second embodiment provides a method according to the first embodiment, wherein:
the device outside of the foveal vision of the user is within peripheral vision of the user;
the displaying of the graphical user interface displays the graphical user interface within the peripheral vision of the user; and
the presenting of the acknowledgment includes displaying the acknowledgment within the peripheral vision of the user.

A third embodiment provides a method according to the first embodiment or the second embodiment, wherein:
the graphical user interface has a predominant color that is a first color prior to the detecting that the device received the user input; and
the presenting of the acknowledgment includes changing the predominant color of the graphical user interface from the first color to a second color in response to the detecting that the device received the user input.

A fourth embodiment provides a method according to the third embodiment, wherein:
the changing of the predominant color from the first color to the second color includes modifying at least two parameters selected from a group consisting of a hue of the first color, a saturation of the first color, and a brightness of the first color, to obtain the second color.

A fifth embodiment provides a method according to the fourth embodiment, wherein:
the modifying of the at least two parameters modifies each of the at least two parameters by at least a predetermined percentage.

A sixth embodiment provides a method according to the third embodiment or the fourth embodiment, wherein:
the presenting of the acknowledgment includes causing the graphical user interface to flash prior to the changing of the predominant color from the first color to the second color.

A seventh embodiment provides a method according to a third embodiment or the fourth embodiment, wherein:
the presenting of the acknowledgment includes causing the graphical user interface to flash subsequent to the changing of the predominant color from the first color to the second color.

An eighth embodiment provides a method according to any of the first through seventh embodiments, wherein:
the presenting of the acknowledgment includes causing the touchscreen of the device to flash in response to the detecting that the device received the user input.

A ninth embodiment provides a method according to any of the first through eighth embodiments, wherein:
the graphical user interface includes a target icon that indicates a centroid of the control region that is operable to request execution of the command.

A tenth embodiment provides a method according to any of the first through ninth embodiments, wherein:
the graphical user interface includes a target icon located at a non-centroid location of the control region that is operable to request execution of the command.

An eleventh embodiment provides a method according to any of the first through tenth embodiments, wherein:
the presenting of the acknowledgment includes causing the device to produce a non-visual effect that acknowledges the user input.

A twelfth embodiment provides a method according to the eleventh embodiment, wherein:
the graphical user interface presents a text label outside of the foveal vision of the user; and
the non-visual effect includes a vocal confirmation that reads the text label aloud to acknowledge the user input.

A thirteenth embodiment provides a method according to the eleventh embodiment or the twelfth embodiment, wherein:
the non-visual effect includes at least one of a sound effect or a haptic effect that identifies the user input among multiple user inputs available to be received by the device.

A fourteenth embodiment provides a method according to any of the first through thirteenth embodiments, wherein:
the control region spans at least 75% of the graphical user interface.

A fifteenth embodiment provides a method according to any of the first through fourteenth embodiments, wherein:
the graphical user interface spans at least one third of the touchscreen.

A sixteenth embodiment provides a method according to any of the first through fifteenth embodiments, further comprising:
requesting execution of the command in response to the user input.

A seventeenth embodiment provides a method according to any of the first through sixteenth embodiments, wherein:
the user input includes a touch input within the control region on the touchscreen of the device.

An eighteenth embodiment provides a method according to the seventeenth embodiment, wherein:
the touch input is received by the device as a drag input between different locations on the touchscreen; and
the detecting that the device received the touch input includes reclassifying the drag input as a tap input on a single location on the touchscreen.

A nineteenth embodiment provides a method according to any of the first through eighteenth embodiments, wherein:
the user input includes a controller input received from a controller that is communicatively coupled to the device and configured to simulate a touch input within the control region on the touchscreen of the device.

A twentieth embodiment provides a device (e.g., device 130) comprising:
one or more processors (e.g., processor 1202);
an interface module (e.g., interface module 210) that configures at least one processor among the one or more processors to, with a touchscreen of the device being outside of foveal vision of a user of the device, display a graphical user interface on the touchscreen of the device outside of the foveal vision of the user, the displayed graphical user interface including a control region that is operable to request execution of a command;

a detection module (e.g., detection module 220) that configures at least one processor among the one or more processors to detect that the device received a user input that indicates operation of the control region to request execution of the command; and a feedback module (e.g., feedback module 230) that configures at least one processor among the one or more processors to, with the touchscreen being outside of the foveal vision of the user, presenting an acknowledgment of the user input on the touchscreen outside of the foveal vision of the user.

A twenty first embodiment provides a machine-readable medium (e.g., a non-transitory machine-readable storage medium) comprising instructions (e.g., instructions 1224) that, when executed by one or more processors of a machine, cause the machine to perform operations comprising:

at a device outside of foveal vision of a user of the device, displaying a graphical user interface on a touchscreen of the device outside of the foveal vision of the user, the displayed graphical user interface including a control region that is operable to request execution of a command;

detecting that the device received a user input that indicates operation of the control region to request execution of the command; and at the device outside of the foveal vision of the user, presenting an acknowledgment of the user input on the touchscreen outside of the foveal vision of the user.

A twenty second embodiment provides a machine-readable medium according to the twenty first embodiment, wherein:

the device outside of the foveal vision of the user is within peripheral vision of the user;

the displaying of the graphical user interface displays the graphical user interface within the peripheral vision of the user; and the presenting of the acknowledgment includes displaying the acknowledgment within the peripheral vision of the user.

A twenty third embodiment provides a machine-readable medium according to the twenty first embodiment or the twenty second embodiment, wherein:

the presenting of the acknowledgment includes displaying an animation within peripheral vision of the user.

A twenty fourth embodiment provides a carrier medium carrying machine-readable instructions (e.g., instructions 1224) for controlling a machine to carry out the method of any of the previously described embodiments.

What is claimed is:

1. A method comprising:
   at a device outside of foveal vision of a user of the device, displaying a graphical user interface on a touchscreen of the device outside of the foveal vision of the user, the displayed graphical user interface including a control region that is operable to request execution of a command;
   detecting that the device received a user input that indicates operation of the control region to request execution of the command, the graphical user interface having a predominant color that is a first color prior to the detecting that the device received the user input; and
   at the device outside of the foveal vision of the user, presenting an acknowledgment of the user input on the touchscreen outside of the foveal vision of the user, the presenting of the acknowledgment being performed by a processor of the device and including changing the predominant color of the graphical user interface from the first color to a second color in response to the detecting that the device received the user input, the changing of the predominant color from the first color to the second color including modifying at least two parameters selected from a group consisting of a hue of the first color, a saturation of the first color, and a brightness of the first color, to obtain the second color.

2. The method of claim 1, wherein:
   the device outside of the foveal vision of the user is within peripheral vision of the user;
   the displaying of the graphical user interface displays the graphical user interface within the peripheral vision of the user; and
   the presenting of the acknowledgment includes displaying the acknowledgment within the peripheral vision of the user.

3. The method of claim 1, wherein:
   the modifying of the at least two parameters modifies each of the at least two parameters by at least a predetermined percentage.

4. The method of claim 1, wherein:
   the presenting of the acknowledgment includes causing the graphical user interface to flash prior to the changing of the predominant color from the first color to the second color.

5. The method of claim 1, wherein:
   the presenting of the acknowledgment includes causing the graphical user interface to flash subsequent to the changing of the predominant color from the first color to the second color.

6. The method of claim 1, wherein:
   the presenting of the acknowledgment includes causing the touchscreen of the device to flash in response to the detecting that the device received the user input.

7. The method of claim 1, wherein:
   the graphical user interface includes a target icon that indicates a centroid of the control region that is operable to request execution of the command.

8. The method of claim 1, wherein:
   the graphical user interface includes a target icon located at a non-centroid location of the control region that is operable to request execution of the command.

9. The method of claim 1, wherein:
   the presenting of the acknowledgment includes causing the device to produce a non-visual effect that acknowledges the user input.

10. The method of claim 9, wherein:
    the graphical user interface presents a text label outside of the foveal vision of the user; and
    the non-visual effect includes a vocal confirmation that reads the text label aloud to acknowledge the user input.

11. The method of claim 9, wherein:
    the non-visual effect includes at least one of a sound effect or a haptic effect that identifies the user input among multiple user inputs available to be received by the device.

12. The method of claim 1, wherein:
    the control region spans at least 75% of the graphical user interface.

13. The method of claim 1, wherein:
    the graphical user interface spans at least one third of the touchscreen.

14. The method of claim 1 further comprising:
requesting execution of the command in response to the user input.

15. The method of claim 1, wherein:
the user input includes a touch input within the control region on the touchscreen of the device.

16. The method of claim 15, wherein:
the touch input is received by the device as a drag input between different locations on the touchscreen; and
the detecting that the device received the touch input includes reclassifying the drag input as a tap input on a single location on the touchscreen.

17. The method of claim 1, wherein:
the user input includes a controller input received from a controller that is communicatively coupled to the device and configured to simulate a touch input within the control region on the touchscreen of the device.

18. A device comprising:
one or more processors;
an interface module that configures at least one processor among the one or more processors to, with a touchscreen of the device being outside of foveal vision of a user of the device, display a graphical user interface on the touchscreen of the device outside of the foveal vision of the user, the displayed graphical user interface including a control region that is operable to request execution of a command;
a detection module that configures at least one processor among the one or more processors to detect that the device received a user input that indicates operation of the control region to request execution of the command, the graphical user interface having a predominant color that is a first color prior to a detection that the device received the user input; and
a feedback module that configures at least one processor among the one or more processors to, with the touchscreen being outside of the foveal vision of the user, present an acknowledgment of the user input on the touchscreen outside of the foveal vision of the user, a presentation of the acknowledgement including changing the predominant color of the graphical user interface from the first color to a second color in response to the detecting that the device received the user input, the changing of the predominant color from the first color to the second color including modifying at least two parameters selected from a group consisting of a hue of the first color, a saturation of the first color, and a brightness of the first color, to obtain the second color.

19. A non-transitory machine-readable storage medium comprising instructions that, when executed by one or more processors of a machine, cause the machine to perform operations comprising:
at a device outside of foveal vision of a user of the device, displaying a graphical user interface on a touchscreen of the device outside of the foveal vision of the user, the displayed graphical user interface including a control region that is operable to request execution of a command;
detecting that the device received a user input that indicates operation of the control region to request execution of the command, the graphical user interface having a predominant color that is a first color prior to the detecting that the device received the user input; and
at the device outside of the foveal vision of the user, presenting an acknowledgment of the user input on the touchscreen outside of the foveal vision of the user, the presenting of the acknowledgement including changing the predominant color of the graphical user interface from the first color to a second color in response to the detecting that the device received the user input, the changing of the predominant color from the first color to the second color including modifying at least two parameters selected from a group consisting of a hue of the first color, a saturation of the first color, and a brightness of the first color, to obtain the second color.

20. The non-transitory machine-readable storage medium of claim 19, wherein:
the device outside of the foveal vision of the user is within peripheral vision of the user;
the displaying of the graphical user interface displays the graphical user interface within the peripheral vision of the user; and
the presenting of the acknowledgment includes displaying the acknowledgment within the peripheral vision of the user.

21. The non-transitory machine-readable storage medium of claim 19, wherein:
the presenting of the acknowledgment includes displaying an animation within peripheral vision of the user.

22. A method comprising:
at a device outside of foveal vision of a user of the device, displaying a graphical user interface on a touchscreen of the device outside of the foveal vision of the user, the displayed graphical user interface including a control region that is operable to request execution of a command;
detecting that the device received a user input that indicates operation of the control region to request execution of the command, the graphical user interface having a predominant color that is a first color prior to the detecting that the device received the user input; and
at the device outside of the foveal vision of the user, presenting an acknowledgment of the user input on the touchscreen outside of the foveal vision of the user, the presenting of the acknowledgment being performed by a processor of the device and including changing the predominant color of the graphical user interface from the first color to a second color in response to the detecting that the device received the user input, the presenting of the acknowledgment further including causing the graphical user interface to flash prior to the changing of the predominant color from the first color to the second color.

23. A device comprising:
one or more processors;
an interface module that configures at least one processor among the one or more processors to, with a touchscreen of the device being outside of foveal vision of a user of the device, display a graphical user interface on the touchscreen of the device outside of the foveal vision of the user, the displayed graphical user interface including a control region that is operable to request execution of a command;
a detection module that configures at least one processor among the one or more processors to detect that the device received a user input that indicates operation of the control region to request execution of the command, the graphical user interface having a predominant color that is a first color prior to a detection that the device received the user input; and
a feedback module that configures at least one processor among the one or more processors to, with the touchscreen being outside of the foveal vision of the user, present an acknowledgment of the user input on the touchscreen outside of the foveal vision of the user, a presentation of the acknowledgement including changing the predominant color of the graphical user interface from the first color to a second color in response to the detecting that the device received the user input, the presentation of the acknowledgment further including causing the graphical user interface to flash prior to the changing of the predominant color from the first color to the second color.

24. A non-transitory machine-readable storage medium comprising instructions that, when executed by one or more processors of a machine, cause the machine to perform operations comprising:

at a device outside of foveal vision of a user of the device, displaying a graphical user interface on a touchscreen of the device outside of the foveal vision of the user, the displayed graphical user interface including a control region that is operable to request execution of a command;

detecting that the device received a user input that indicates operation of the control region to request execution of the command, the graphical user interface having a predominant color that is a first color prior to the detecting that the device received the user input; and at the device outside of the foveal vision of the user, presenting an acknowledgment of the user input on the touchscreen outside of the foveal vision of the user, the presenting of the acknowledgment being performed by a processor of the device and including changing the predominant color of the graphical user interface from the first color to a second color in response to the detecting that the device received the user input, the presenting of the acknowledgment further including causing the graphical user interface to flash prior to the changing of the predominant color from the first color to the second color.

25. A method comprising:

at a device outside of foveal vision of a user of the device, displaying a graphical user interface on a touchscreen of the device outside of the foveal vision of the user, the displayed graphical user interface including a control region that is operable to request execution of a command;

detecting that the device received a user input that indicates operation of the control region to request execution of the command, the graphical user interface having a predominant color that is a first color prior to the detecting that the device received the user input; and at the device outside of the foveal vision of the user, presenting an acknowledgment of the user input on the touchscreen outside of the foveal vision of the user, the presenting of the acknowledgment being performed by a processor of the device and including changing the predominant color of the graphical user interface from the first color to a second color in response to the detecting that the device received the user input, the presenting of the acknowledgment further including causing the graphical user interface to flash subsequent to the changing of the predominant color from the first color to the second color.

26. A device comprising:

one or more processors;

an interface module that configures at least one processor among the one or more processors to, with a touchscreen of the device being outside of foveal vision of a user of the device, display a graphical user interface on the touchscreen of the device outside of the foveal vision of the user, the displayed graphical user interface including a control region that is operable to request execution of a command;

a detection module that configures at least one processor among the one or more processors to detect that the device received a user input that indicates operation of the control region to request execution of the command, the graphical user interface having a predominant color that is a first color prior to a detection that the device received the user input; and a feedback module that configures at least one processor among the one or more processors to, with the touchscreen being outside of the foveal vision of the user, present an acknowledgment of the user input on the touchscreen outside of the foveal vision of the user, a presentation of the acknowledgement including changing the predominant color of the graphical user interface from the first color to a second color in response to the detecting that the device received the user input, the presentation of the acknowledgment further including causing the graphical user interface to flash subsequent to the changing of the predominant color from the first color to the second color.

27. A non-transitory machine-readable storage medium comprising instructions that, when executed by one or more processors of a machine, cause the machine to perform operations comprising:

at a device outside of foveal vision of a user of the device, displaying a graphical user interface on a touchscreen of the device outside of the foveal vision of the user, the displayed graphical user interface including a control region that is operable to request execution of a command;

detecting that the device received a user input that indicates operation of the control region to request execution of the command, the graphical user interface having a predominant color that is a first color prior to the detecting that the device received the user input; and at the device outside of the foveal vision of the user, presenting an acknowledgment of the user input on the touchscreen outside of the foveal vision of the user, the presenting of the acknowledgment being performed by a processor of the device and including changing the predominant color of the graphical user interface from the first color to a second color in response to the detecting that the device received the user input, the presenting of the acknowledgment further including causing the graphical user interface to flash subsequent to the changing of the predominant color from the first color to the second color.

* * * * *